United States Patent
Yang et al.

(10) Patent No.: US 8,976,324 B2
(45) Date of Patent: Mar. 10, 2015

(54) DISPLAYS WITH OPTICAL FIBER LAYERS

(71) Applicant: Apple Inc., Cupertino, CA (US)

(72) Inventors: Tseng-Mau Yang, Kitchener (CA); Christopher D. Prest, San Francisco, CA (US); Dale N. Memering, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 13/758,910

(22) Filed: Feb. 4, 2013

(65) Prior Publication Data

US 2014/0016071 A1    Jan. 16, 2014

Related U.S. Application Data

(60) Provisional application No. 61/671,622, filed on Jul. 13, 2012.

(51) Int. Cl.
  *G02F 1/1333*    (2006.01)
  *G02F 1/1335*    (2006.01)
  *F21V 8/00*      (2006.01)

(52) U.S. Cl.
  CPC ........ *G02F 1/133524* (2013.01); *G02B 6/0005* (2013.01); *G02B 6/0008* (2013.01)
  USPC ................ 349/92; 349/158; 349/84; 349/112

(58) Field of Classification Search
  CPC ............ G02F 1/1333; G02F 1/133305; G02F 1/133351; G02F 1/133377; G02F 1/133512; G02F 1/133345; G02F 1/133504; G02F 1/1334; G02F 1/1341; G02B 5/0278; G02B 5/0242; C09K 19/544
  USPC ...................... 349/92, 84, 112, 158
  See application file for complete search history.

(56) References Cited

U.S. PATENT DOCUMENTS

| | | | |
|---|---|---|---|
| 3,402,000 A | | 9/1968 | Crawford |
| 4,904,049 A | | 2/1990 | Hegg |
| 5,442,467 A | * | 8/1995 | Silverstein et al. ........... 349/159 |
| 5,751,390 A | * | 5/1998 | Crawford et al. ............. 349/120 |
| 5,754,719 A | | 5/1998 | Chen et al. |
| 7,856,161 B2 | | 12/2010 | Tabor |
| 7,914,192 B2 | | 3/2011 | Coleman |
| 2001/0031115 A1 | | 10/2001 | Chen et al. |
| 2003/0012532 A1 | | 1/2003 | Prigent |
| 2004/0017985 A1 | | 1/2004 | Cok et al. |

FOREIGN PATENT DOCUMENTS

| | | |
|---|---|---|
| EP | 2439582 | 11/2012 |
| GB | 2058384 | 4/1981 |
| WO | 2009122691 | 10/2009 |

* cited by examiner

*Primary Examiner* — Mike Qi
(74) *Attorney, Agent, or Firm* — Treyz Law Group; Kendall P. Woodruff

(57) ABSTRACT

An electronic device may have a display such as a liquid crystal display. The display may have multiple display layers for generating display light such as a color filter layer and a thin-film transistor layer. The display may include first and second layers of optical fibers formed over the display layers. The first and second layers of optical fibers may guide display light generated in the display layers to an outer surface of the display. The first layer of optical fibers may include optical fibers having a first numerical aperture. The second layer of optical fibers may include optical fibers having a second numerical aperture. The first numerical aperture may be smaller than the second numerical aperture. The second layer of optical fibers may include vertical and angled optical fibers. The angled optical fibers may help reduce the size of an inactive region around the center of the display.

22 Claims, 10 Drawing Sheets

DISPLAYS WITH OPTICAL FIBER LAYERS

This application claims priority to U.S. provisional patent application No. 61/671,622 filed Jul. 13, 2012, which is hereby incorporated by reference herein in its entirety.

BACKGROUND

This relates generally to electronic devices and, more particularly, to electronic devices with displays.

Electronic devices such as computers and cellular telephones have displays. In a typical display such as a liquid crystal display, an array of display pixels is used to display images for a user. Each display pixel commonly contains an electrode that is used to apply an adjustable electric field to a portion of a liquid crystal layer. The magnitude of the electric field in each pixel controls how much light is allowed to pass through the display to the user.

Displays are commonly positioned within a device in a way that allows room for additional device structures. For example, displays are often covered by one or more display layers and thick protective cover layers. Because the display images generated by the display pixels are generated below these layers, the display image may appear to be located at some distance within the device. This type of arrangement can affect the aesthetics of the device.

As another example, control circuitry for the display is often formed along an edge of the display and space within the device is needed to accommodate the control circuitry. An unused portion of the front face of the display is commonly provided behind which this control circuitry is located.

It would therefore be desirable to be able to provide electronic devices with improved displays.

SUMMARY

An electronic device may have a display such as a liquid crystal display. The display may have multiple layers of material such as a color filter layer and a thin-film transistor layer. A layer of liquid crystal material may be interposed between the color filter layer and the thin-film transistor layer.

Display layers such as the color filter layer, the thin-film transistor layer, the liquid crystal layer, and other display layers may be covered by one or more substrate layers that contain optical fibers. For example, a display may include a first optical fiber layer that is attached to the display layers. The first optical fiber layer may be interposed between the display layers and a second optical fiber layer.

The first optical fiber layer may include bundled fiber optic light guide structures such as bundled optical fibers that are characterized by a first diameter and a first numerical aperture. The second optical fiber layer may include bundled fiber optic light guide structures such as bundled optical fibers that are characterized by a second diameter and a second numerical aperture. The first diameter may be larger than the second diameter. The first numerical aperture may be smaller than the second numerical aperture.

Display light generated in the display layers may pass through the first fiber optic light guide structures and into the second fiber optic light guide structures. The display light may be emitted from an outer surface of the second optical fiber layer. In this way, display images may be generated that appear to a viewer of the display to be generated at the outer surface of the display.

The outer surface of the second optical fiber layer may, if desired, form an outer surface of the electronic device. The second optical fiber layer may be formed form a transparent material such as glass that forms a portion of a protective outer enclosure for the electronic device.

The second optical fiber layer may include vertical fiber optic light guide structures such as vertical optical fibers and angled fiber optic light guide structures such as angled optical fibers. The angled optical fibers may guide display light from a central portion of the display to an edge portion of the display. In this way, an inactive area at the edge of the display may be minimized or eliminated.

Further features of the invention, its nature and various advantages will be more apparent from the accompanying drawings and the following detailed description of the preferred embodiments.

DETAILED DESCRIPTION

An electronic device may be provided with a display having one or more layers of bundled fiber optic light guide structures. The display may include an array of display pixels that generate display light of a given color for the display. The display may be provided with a first layer of bundled fiber optic light guide structures that passes light from the display pixels to a second fiber optic bundle layer. The second fiber optic bundle layer may pass the light from the first fiber optic bundle layer to the outer surface of the display to be viewed by a user of the electronic device. A bundled fiber optic layer may also be referred to herein as a fiber optic bundle layer, a fiber bundle layer, an optical fiber layer, a bundled optical fiber layer, a layer of optical fibers, an array of optical fibers, fiber optic layers, etc.

Figure 1:
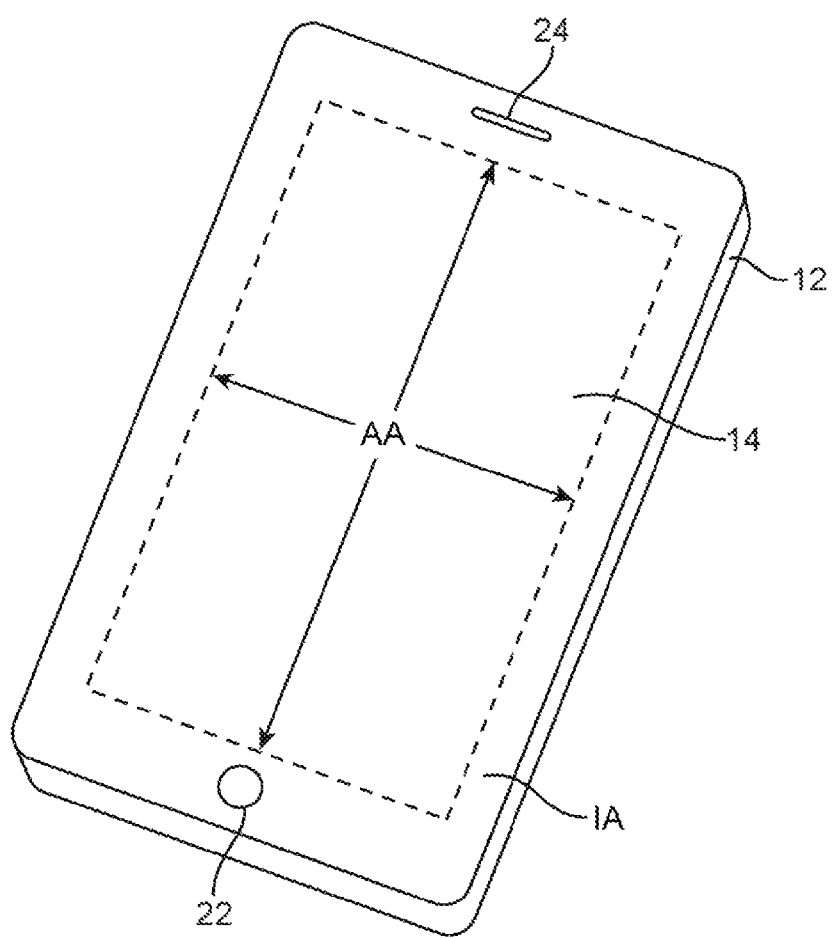
FIG. 1 is a perspective view of an illustrative electronic device with a display having optical fiber layers in accordance with an embodiment of the present invention.

An illustrative electronic device of the type that may be provided with a display having layers of bundled fiber optic light guide structures is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures such as organic light emitting diode (OLED) structures. Arrangements in which display 14 is formed using liquid crystal display pixels are sometimes described herein as an example. This is, however, merely illustrative. Any suitable type of display technology may be used in forming display 14, if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

If desired, housing 12 may have multiple parts. For example, housing 12 may have an upper portion and a lower portion coupled to the upper portion using a hinge that allows the lower portion to rotate about rotational axis relative to the upper portion. Electronic components such as a keyboard and/or a touch pad may also be mounted in housing 12, if desired.

Display 14 may have an active area such as active area AA and an inactive area such as area IA. Active area AA may be, for example, a rectangular region in the center of display 14 in which display pixels are actively used to display images for a user of device 10. Inactive area IA may be devoid of active display pixels. In the example of FIG. 1, inactive area IA has the shape of a rectangular ring, surrounding the periphery of active area AA of display 14. Circuitry and other components may sometimes be formed in inactive area IA. To hide the circuitry and other components from view by a user of device 10, inactive area IA may sometimes be provided with an opaque mask. The opaque mask can be formed from an opaque material such as a black material or may be formed from opaque masking materials of other colors. Configurations in which the opaque masking material in display 14 has a black appearance are sometimes described herein as an example. This is, however, merely illustrative. Opaque masking layers in device 10 may have any suitable colors.

In the example of FIG. 1, device 10 has been implemented using a housing that is sufficiently small to fit within a user's hand (i.e., device 10 of FIG. 1 may be a handheld electronic device such as a cellular telephone). Display 14 may have openings (e.g., openings in inactive region IA or active region AA of display 14) such as an opening to accommodate button 22 and an opening to accommodate speaker port 24.

Figure 2:
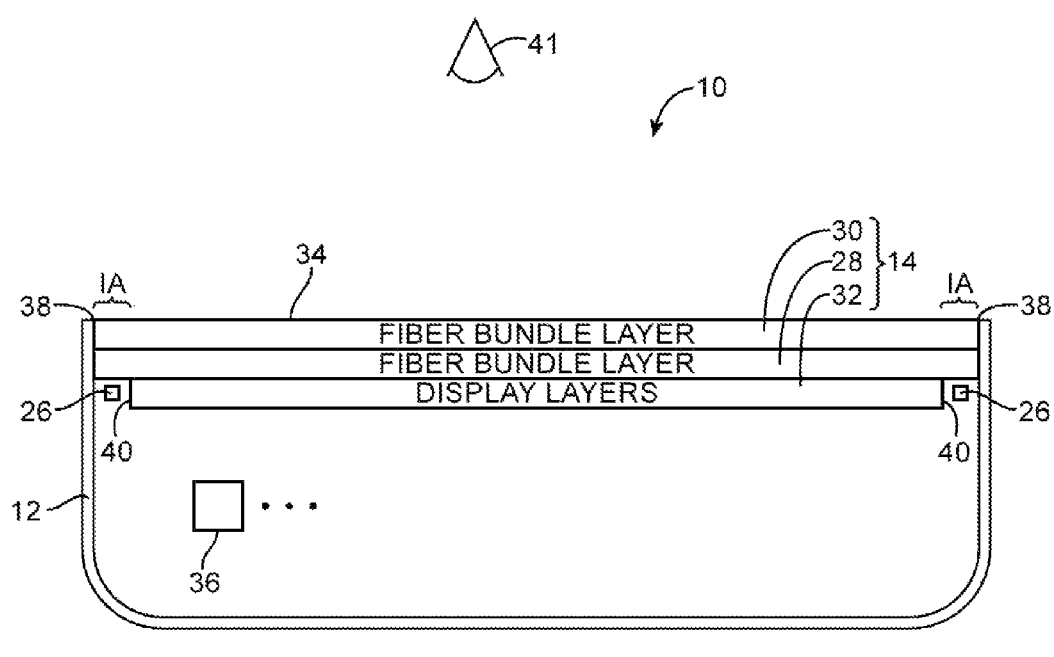
FIG. 2 is a cross-sectional end view of an illustrative electronic device with a display having optical fiber layers in accordance with an embodiment of the present invention.

As shown in the cross-sectional end view of FIG. 2, display 14 may include one or more display layers 32 for generating colored light for display 14 and one or more layers of bundled fiber optic light guide structures (optical fiber layers) such as fiber optic layers 28 and 30. Display layers 32 may include layers such as color filter layers, transistor layers, backlight layers, reflective layers, polarizer layers, adhesive layers, and layers of liquid crystal material. Fiber optic layers 28 and 30 may be formed from glass, plastic, or other suitable material. Fiber optic layers 28 and 30 may each include multiple fiber optic light guide structures such as optical fibers that guide light from display layers 32 to outer surface 34 of display 14. Fiber optic bundle layers 28 and 30 may be arranged so that light that is generated in display layers 32 appears to a user such as user 41 of device 10 to have been generated at surface 34.

If desired, display 14 may include a light diffusion layers interposed between layer 28 and layer 30.

As shown in FIG. 2, circuitry and other components may such as components 26 may be formed behind portions of layers 28 and/or 30. Components 26 may, for example, include a display driver integrated circuit that generates control signals for operating display pixels in the display. Device 10 may include additional circuitry such as component 36. Components such as component 36 may include batteries, printed circuit boards, flexible printed circuits, buttons, switches, microphones, speakers, compasses, or other circuitry. If desired, components 26 may be coupled to additional components 36 (e.g., using a flexible printed circuit).

As shown in FIG. 2, surface 34 of outer fiber bundle layer 30 may form an outer surface of electronic device 10. In configurations in which surface 34 forms an outer surface of device 10, layer 30 may be formed from a material that is sufficiently strong to form a portion of a protective outer enclosure (e.g., an enclosure formed by housing 12 and layer 30 within which components 26 and 36 are mounted) for device 10. However, this is merely illustrative. If desired, outer surface 34 of layer 30 may be covered by one or more coatings or other protective materials that form a protective outer layer for device 10.

In some configurations, in order to hide components 26 from view by user 41 of device 10, inactive area IA may sometimes be provided with an opaque mask such as a black mask. This is, however, merely illustrative. Opaque masking layers in device 10 may have colors other than black or components 26 may be hidden from view using other configurations.

For example, if desired, display 14 may be configured so as to minimize or eliminate the size of inactive region IA along one or more edges of active region AA (FIG. 1). For example, an outer fiber optic bundle layer such as layer 30 may include angled fiber optic light guide structures that guide some of display light from display layers 32 located in a relatively central portion of display 14 toward one of edges 38 of layer 30 (i.e., in a direction that is different from the Z-direction of FIG. 2 in the X-Z plane). In this way, display 14 may be provided with the ability to display light on portions of surface 34 that are nearer to edges 38 than edges 40 are to edges 38 while allowing space for components 26 along one or more edges 40 of layers 32, thereby reducing or eliminating inactive region IA.

Layer 30 may also include vertical fiber optic light guide structures that guide some of display light from display layers 32 located in a central portion of display 14 vertically to surface 34 in a direction that is parallel to the Z-direction of FIG. 2. However, this is merely illustrative. If desired, layer 30 may include only vertical fiber optic light guide structures that guide display light from display layers 32 vertically to surface 34 in a direction that is parallel to the Z-direction of FIG. 2 without including any angled fiber optic light guide structures.

Figure 3:
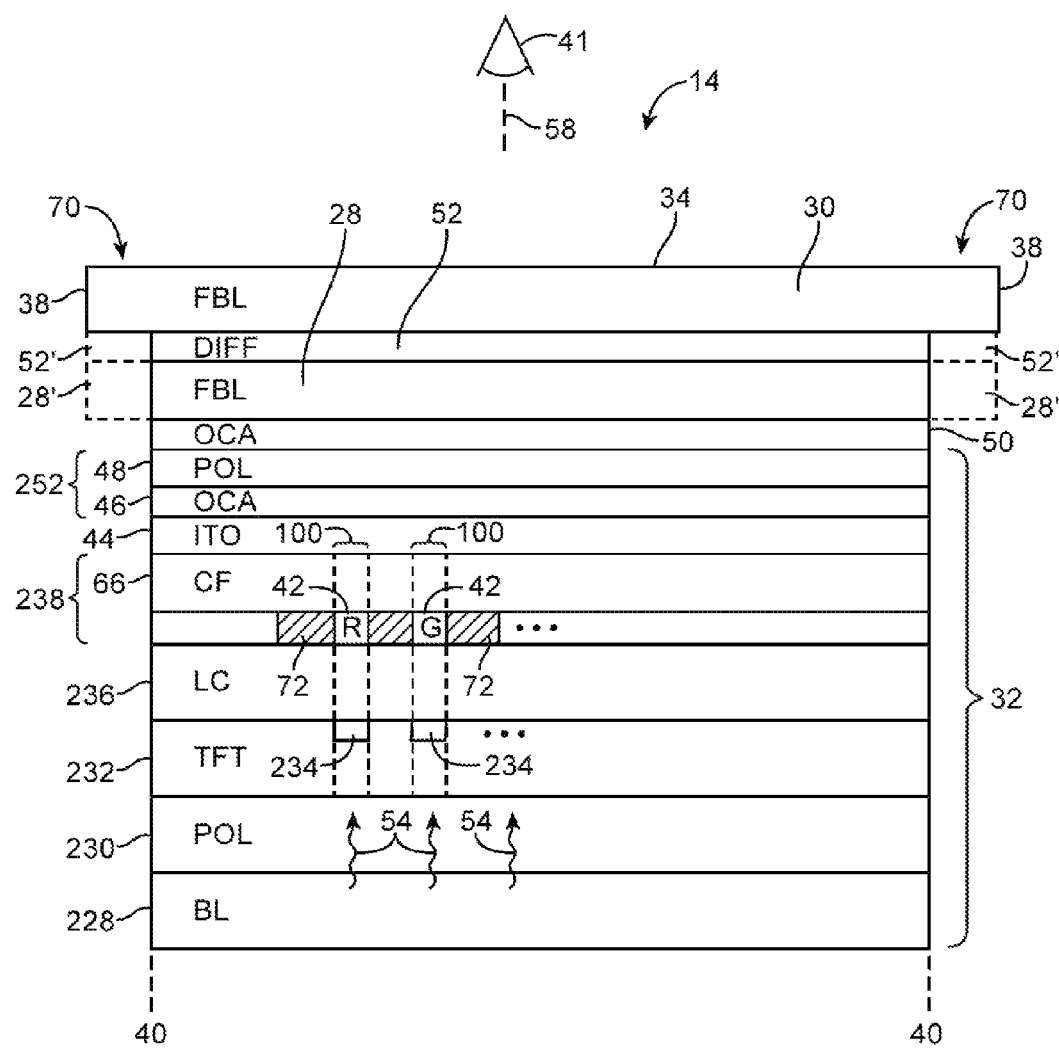
FIG. 3 is a cross-sectional end view of an illustrative display with multiple bundled optical fiber layers in accordance with an embodiment of the present invention.

Display 14 may be, for example, a liquid crystal display such as display 14 of FIG. 3. Display 14 may include an array of display pixels 100. Each pixel 100 may be used to control the light intensity associated with a portion of the display.

Display 14 may have a layer of liquid crystal material such as liquid crystal material 236 that is sandwiched between a pair of polarizers such as upper polarizer 252 and lower polarizer 230. An array of electrodes may be controlled by the thin-film transistor circuitry in a thin-film transistor layer in display 14. As shown in FIG. 3, for example, display 14 may have an array of electrodes and associated thin-film transistor circuits such as thin-film transistor circuitry 234 on thin-transistor substrate layer 232 (e.g., a glass substrate). Thin-film transistor circuitry 234 may include thin-film transistor circuitry such as amorphous silicon transistor circuitry or polysilicon transistor circuitry. Thin film transistor circuitry 234 may also include interconnect lines to connect electrodes formed from conductive materials such as indium tin oxide and metal to thin-film structures such as thin-film transistors.

The electrodes in thin-film transistor circuitry 234 may be used to produce electric fields that control the orientation of liquid crystals in liquid crystal layer 236. Backlight unit 228 may be used to produce backlight 54 for display 14. Backlight 54 may pass through display 14 in vertical direction Z. By controlling the orientation of the liquid crystals in layer 236, the polarization of backlight 54 may be controlled. In combination with the presence of polarizer layers 230 and 252, the ability to control the polarization of the light passing through individual pixels 100 of liquid crystal material 236 provides display 14 with the ability to display images for viewer 41 viewing display in a direction such as direction 58.

Backlight unit 228 may include a light source such as a light-emitting diode array for producing backlight 54. Polarizers such as polarizer 230 and polarizer 252 may be formed from thin polymer films. For example, polarizer 252 may be formed from polymer film 48 and an associated adhesive layer such as optically clear adhesive layer 46.

Figure 5:
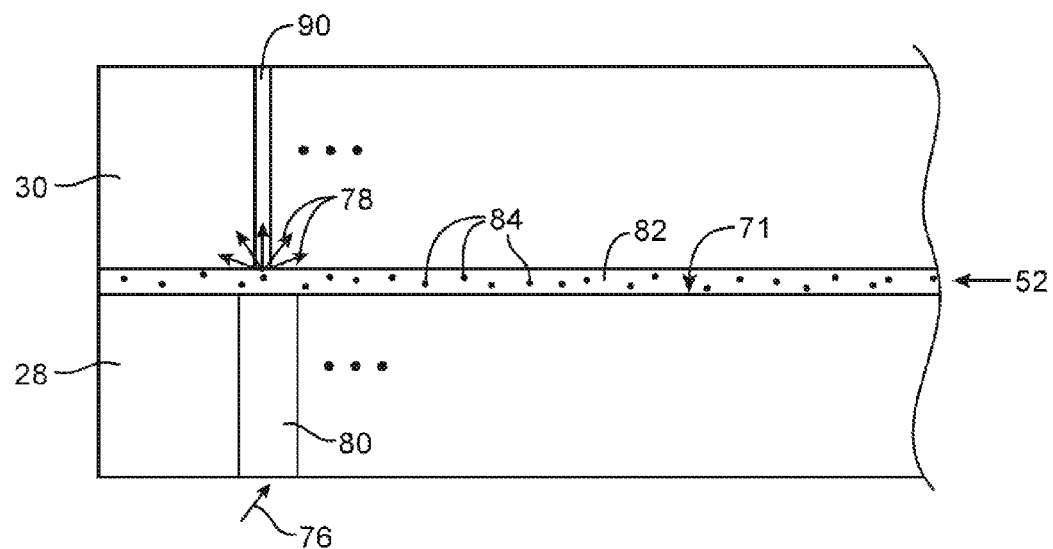
FIG. 5 is a cross-sectional side view of a portion of an illustrative diffusion layer that is interposed between optical fiber layers and that is formed from an adhesive layer with embedded light redirecting structures in accordance with an embodiment of the present invention.

If desired, display 14 may be provided with layers for reducing fingerprints (e.g., a smudge-resistant coating in a touch-sensitive display), anti-scratch coatings, an antireflection coating, a layer for reducing the impact of static electricity such as indium tin oxide electrostatic discharge protection layer 44 of FIG. 5, or other layers of material. The display layers that are used in the illustrative configuration of FIG. 2 are merely illustrative.

Display 14 may include a display layer such as color filter layer 238. Color filter layer 238 may include a color filter layer substrate such as substrate 66. Substrate 66 and the substrate for thin-film transistor layer 232 may be formed from clear layers of material such as glass or plastic.

Color filter layer 238 may include an array of color filter elements 42 formed on substrate 66. Color filter elements 42 may include, for example, red elements R, green elements G, and blue elements (not shown). The array of color filter elements in color filter layer 238 may be used to provide display 14 with the ability to display color images. Each electrode 234 in thin-film transistor layer 232 may be provided with a respective overlapping color filter element 42.

Adjacent color filter elements 42 may be separated by interposed portions of opaque masking material 72. Opaque masking material 72 may be formed from a dark substance such as a polymer that contains a black pigment and is therefore sometimes referred to as a black mask, black masking layer, black pigmented layer, or black masking material. Illustrative polymeric materials for forming black masking layer 72 include acrylic-based and polyimide-based photoresists. An illustrative black pigment that may be used for black masking layer 72 is amorphous carbon (e.g., carbon black).

In active region AA, black mask 72 may be formed from a grid of relatively thin lines (sometimes referred to as a black matrix). The black matrix may have a pattern of openings such as an array of rectangular holes for receiving color filter elements 42. In some configurations, in inactive region IA, black masking material may be used in forming a peripheral black mask that serves as a black border for display 14. The black mask in inactive area IA may have a rectangular ring shape that surrounds a central rectangular active area AA (as an example). However, this is merely illustrative. If desired, in configurations in which layer 30 includes angled fiber optic light guide structures that guide some of display light from display layers 32 toward one of edges 38 of layer 30, display 14 may be provided without a peripheral black mask.

As shown in FIG. 3, fiber bundle layer 28 may be attached to polarizer layer 48 using an adhesive such as optically clear adhesive layer 50. Fiber bundle layer 28 may be formed from plastic, glass, or other suitable material in which fiber optic light guide structures may be formed. Fiber bundle layer 28 may include one or more fiber optic light guide structures (optical fibers) associated with each pixel 100. As examples, fiber bundle layer 28 may include four, nine, twenty five, thirty six, forty nine, sixty four, eight one, more than 81, more than four, less than nine or less than four fiber optic light guide structures that receive display light from each pixel 100.

In one suitable configuration which is sometimes described herein as an example, fiber bundle layer 28 may include nine fiber optic light guide structures formed at least partially over each pixel 100. In this way, fiber optic light guide structures in layer 28 may oversample pixels 100 so that little or no display light from each display pixel is lost.

Fiber optic light guide structures may be characterized by a numerical aperture. The numerical aperture is related to the range of incidence angles that are accepted into a fiber optic light guide structure and the range of output angles at which light can be output from a fiber optic light guide structure. Fiber optic light guide structures having a relatively high numerical aperture accept and emit light in a relatively wide range of respective incidence and output angles. For example, a fiber optic light guide structure having a numerical aperture of one accepts and emits light from a full hemisphere of respective incidence and output angles. A fiber optic light guide structure having a numerical aperture of less than one accepts and emits light from less than a full hemisphere of respective incidence and output angles.

Fiber optic light guide structures in layer 28 may be provided that have numerical apertures that are less than one (e.g., having a relatively small range of acceptable incidence angles) so that light from only one given display pixel is transmitted into a fiber optic light guide structure associated with that given pixel.

Display 14 may include a light diffusing layer such as light diffusing layer 52 formed between fiber bundle layer 28 and fiber bundle layer 30. Display light from pixels 100 that has passed through fiber optic light guide structures in layer 28 may emerge from layer 28 with a relatively narrow range of emission angles due to the relatively low numerical aperture of fiber optic light guide structures in layer 28. Diffusing layer 52 may isotropize the display light emerging from layer 28 so that light from random angles is transmitted in to fiber optic light guide structures in layer 30.

Light diffusing layer 52 may be formed from an adhesive material infused with light redirecting structures such as metallic particles (e.g., metallic spheres). The metallic spheres may be characterized by a diameter that is chosen to optimize the diffusion of light that exits layer 28. However, this is merely illustrative. If desired, light diffusing layer may be formed from a portion of layer 28 and/or a portion of layer 30. For example, a surface of layer 28 that interfaces with layer 30 may be roughed (e.g., sandblasted) so that surface features on that surface cause light that emerges from fiber optic light guide structures in layer 28 to be diffused into a hemispherical distribution of emission angles before passing into layer 30.

Fiber bundle layer 30 may be formed from plastic, glass, or other suitable materials in which fiber optic light guide structures may be formed. Fiber bundle layer 30 may be attached to layer 28 using adhesive associated with diffusion layer 52 or may be fused to layer 28 by heating and compressing layers 28 and 30.

Fiber bundle layer 30 may include one or more fiber optic light guide structures (optical fibers) that receive display light from each fiber optic light guide structure in layer 28. As examples, fiber bundle layer 30 may include four, nine, twenty five, thirty six, forty nine, sixty four, eight one, more than 81, more than four, less than nine or less than four fiber optic light guide structures formed at least partially over each fiber optic light guide structure in layer 28.

In one suitable configuration which is sometimes described herein as an example, fiber bundle layer 30 may include nine fiber optic light guide structures formed over each fiber optic light guide structure in layer 28. In this way, fiber optic light guide structures in layer 30 may oversample fiber optic light guide structures in layer 28 so that little or no display light from each display pixel is lost between layer 28 and layer 30.

Fiber optic light guide structures in layer 30 may be provided that have numerical apertures that are substantially equal to one (e.g., having a full hemispherical range of acceptable incidence angles and emission angles) so that all of the display light received from layer 28 is accepted into fiber optic light guide structures in layer 30 and so that a viewer such as user 41 viewing display 14 at any angle is able to see the display light emerging from layer 30. The gap between layer 28 and layer 30 may be small enough to minimize cross contamination of display light from neighboring pixels.

As shown in FIG. 3, layer 30 may include portions 70 that extend beyond edges 40 of display layers 32. If desired, layer 30 may include angled fiber optic light guide structures that extend from a central portion of layer 30 (e.g., a portion of layer 30 that is located interior to planes defined by edges 40 of display layers 32) into portions 70. Angled fiber optic light guide structures that extend into portions 70 may guide display light from display layers 32 that has passed through layer 28 into portions 70 to be viewed by user 41.

If desired, fiber bundle layer 28 and light diffusing layer 52 may include respective extended portions 28' and 52' that extend beyond edges 40 of display layers 32.

Figure 4:
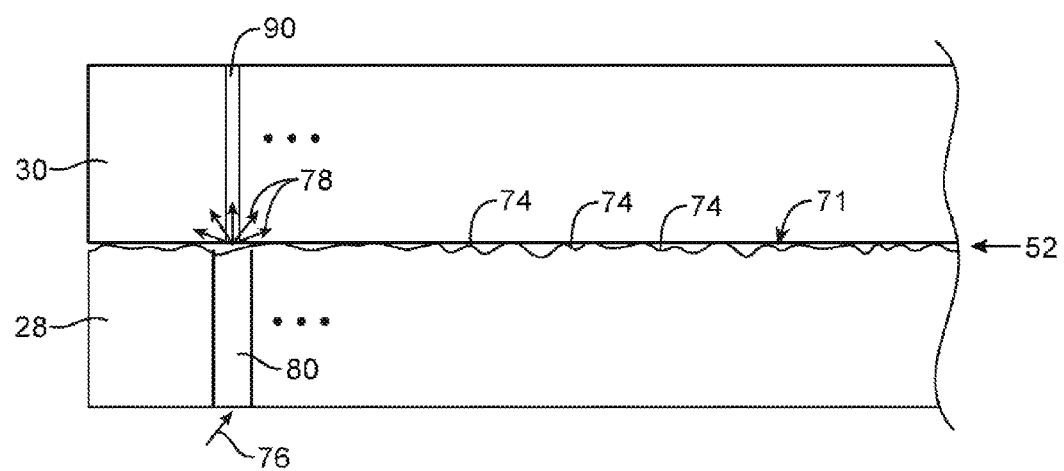
FIG. 4 is a cross-sectional side view of a portion of an illustrative diffusion layer that is interposed between optical fiber layers and that is formed from surface features on at least one of the optical fiber layers in accordance with an embodiment of the present invention.

The cross-sectional side view of fiber bundle layer 28 of FIG. 4 shows how surface features on a surface such as surface 71 of layer 28 may be used to form light diffusing layer 52. As shown in FIG. 4, surface 71 of layer 28 may include surface features 74. Surface features 74 may be formed by spraying or otherwise depositing material onto surface 74 or may be formed by roughing (e.g., sanding, or sand blasting) surface 74 to form surface roughness on surface 74. Light diffusing layer 52 may be formed from features 74 on surface 71.

Light that enters a fiber optic light guide structure such as fiber optic light guide 80 at an angle such as angle 76 may be transmitted within fiber optic light guide 80 (i.e., by total internal reflection of the light within optical fiber 80) into light diffusing layer 52. As shown in FIG. 4, diffusing layer 52 may cause light to be released from surface 71 in a wide range of emission angles (as indicated by arrows 78) into fiber optic light guide structures such as fiber optic light guide 90 in layer 30.

The cross sectional side view of fiber bundle layer 28 of FIG. 5 shows how an adhesive layer having light redirecting structures may be used to form light diffusing layer 52. As shown in FIG. 5, adhesive material such as optically clear adhesive material 82 may be formed on surface 71 of layer 28. Light redirecting structures 84 (e.g., metallic spheres) may be provided in adhesive material 82.

Light that enters a fiber optic light guide structure such as fiber optic light guide 80 at an angle such as angle 76 may be transmitted within fiber optic light guide 80 (i.e., by total internal reflection of the light within fiber 80) into light diffusing layer 52. As shown in FIG. 5, structures 84 in diffusing layer 52 may cause light to be released from diffusing layer 52 in a wide range of emission angles (as indicated by arrows 78) into fiber optic light guide structures such as optical fiber 90 in layer 30.

Figure 6:
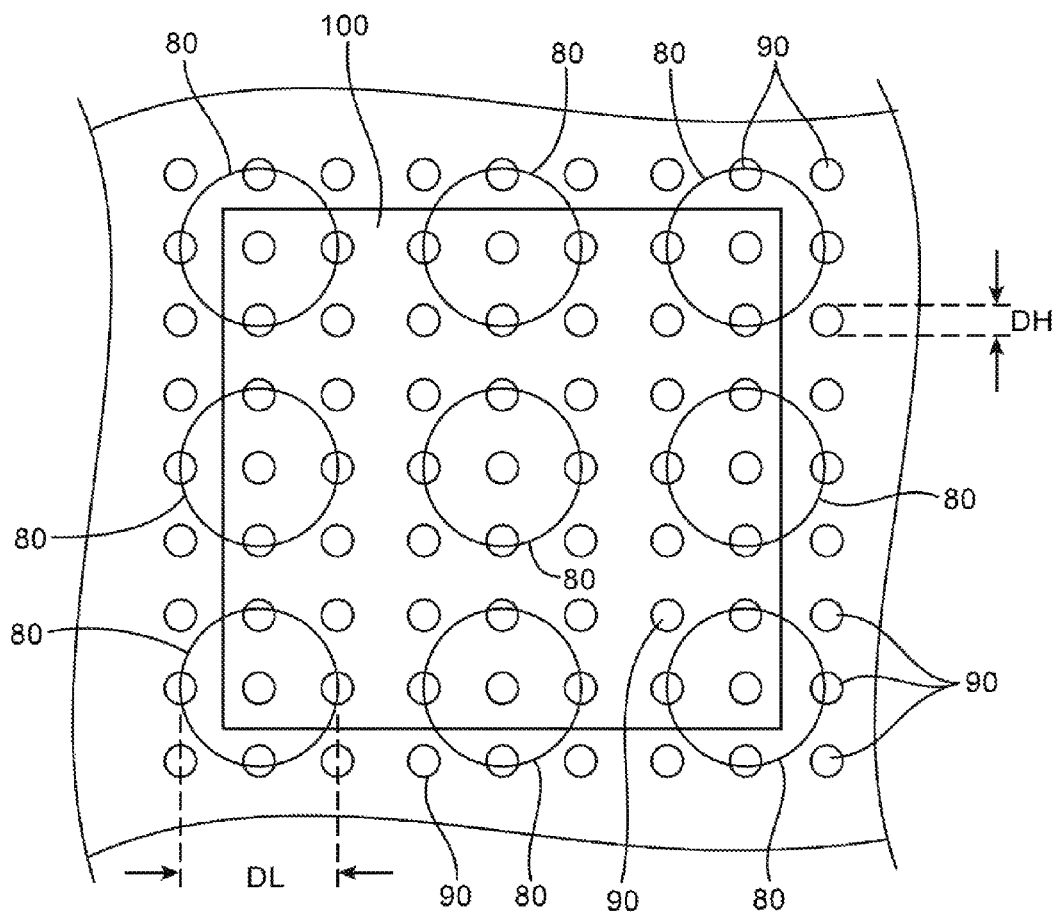
FIG. 6 is a top view of a portion of an illustrative display showing how fiber optic light guide structures in a first bundled optical fiber layer may oversample a display pixel and how fiber optic light guide structures in a second bundled optical fiber layer may oversample the fiber optic light guide structures in the first bundled optical fiber layer in accordance with an embodiment of the present invention.

FIG. 6 is a top view of a portion of display 14 showing how multiple fiber optic light guide structures 80 (i.e., light guide structures in layer 28) may be used to oversample each display pixel 100 of display 14 and how multiple fiber optic light guide structures 90 (i.e., light guide structures in layer 30) may be used to oversample each fiber optic light guide structure 80.

In the example of FIG. 6, each display pixel is nine-times oversampled by fiber optic light guide structures 80 and each fiber optic light guide structure 80 is nine-times oversampled by fiber optic light guide structures 90. This is merely illustrative. Each display pixel 100 may be sampled by any number of fiber optic light guide structures 80 and each fiber optic light guide structure 80 may be sampled by any number of fiber optic light guide structures 90.

As shown in FIG. 6, fiber optic light guide structures 80 may be characterized by a lateral size such as diameter DL and fiber optic light guide structures 90 may be characterized by a lateral size such as diameter DH. However this is merely illustrative. Fiber optic light guide structures 80 and fiber optic light guide structures 90 may have any suitable cross-sectional shape (e.g., square, rectangular, circular, oblong, etc.) characterized by any suitable lateral dimension. Diameter DH of fiber optic light guide structures 90 may be substantially smaller than diameter DL fiber optic light guide structures 80.

As examples, diameter DL may be between 25 and 75 microns, between 40 and 60 microns, between 48 and 52 microns, between 10 and 50 microns, between 50 and 100 microns, more than 25 microns, or less than 100 microns. As examples, diameter DH may be between 3 and 9 microns, between 5 and 7 microns, between 0 and 10 microns, between 5 and 15 microns, between 6 and 10 microns, more than 1 micron, or less than 15 microns.

Figure 7:
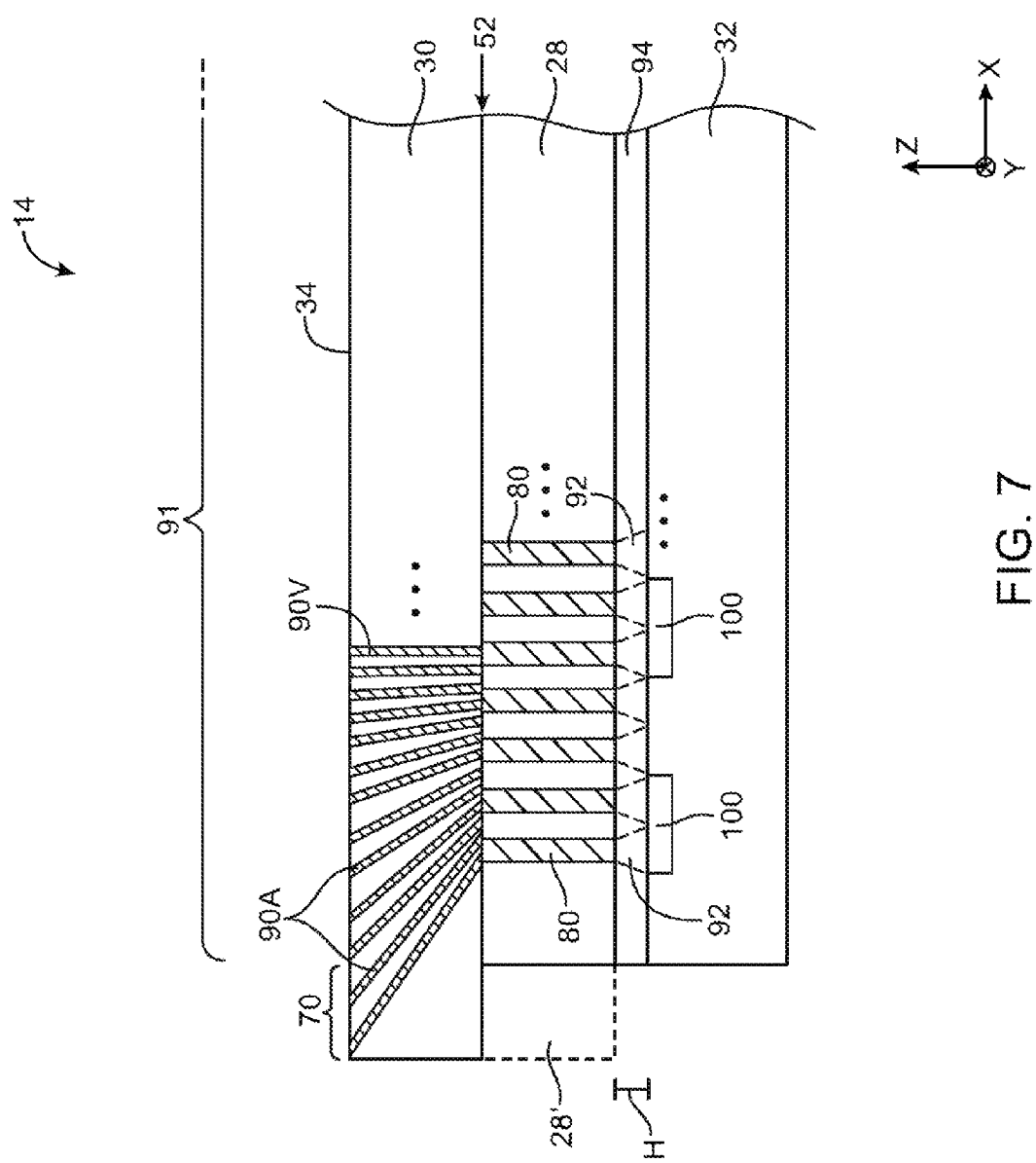
FIG. 7 is a cross-sectional end view of a portion of an illustrative display showing how an outer bundled optical fiber layer may include vertical optical fibers and angled optical fibers in accordance with an embodiment of the present invention.

FIG. 7 is a cross-sectional end view of a portion of display 14 showing how fiber bundle layer 30 may be used to guide display light from a central portion such as portion 91 of display 14 to an edge portion such as portion 70 of display 14.

As shown in FIG. 7, some of fiber optic light guide structures 90 such as fiber optic light guide structures 90A may be angled with respect to surface 34 of layer 30 so that display light that has travelled from a display pixel such as pixel 100 through one or more of fiber optic light guide structures 80 may be guided from central portion 91 toward edge portion 70 of display 14.

Some of fiber optic light guide structures 90 such as fiber optic light guide structures 90V may be vertical fiber optic light guide structures that extend vertically (e.g., along direction Z of FIG. 7) from an inner surface of layer 30 to outer surface 34 of layer 30. In this way, some display light that has been generated in display layers 32 in central portion 91 of display 14 may be emitted from surface 34 in edge portion 70 of display 14 and some display light that has been generated in display layers 32 in central portion 91 of display 14 may be emitted from surface 34 in central portion 91 of display 14.

Display 14 may be provided with a gap such as gap 94 between layer 28 and display layers 32. Gap 94 may be an air gap or may be filled with some of display layers 32. For example, gap 94 may be filled with polarizer layer 252, optically clear adhesive layer 50, indium-tin-oxide layer 44 (see FIG. 2) or other display layers. Gap 94 may have a height H. Height H may, as an example, be between 1.0 and 1.5 mm. Each fiber optic light guide structure 80 in layer 28 may be characterized by an acceptance angle 92 (i.e., a range of angles of incidence from which light from display pixels 100 is transmitted into fiber optic light guide structures 80) that corresponds to the numerical aperture of that fiber optic light guide structure 80.

As examples, fiber optic light guide structures 80 may have numerical apertures between 0.3 and 0.4, between 0.2 and 0.5, between 0.3 and 0.5, between 0.34 and 0.36, between 0.34 and 0.4, between 0.3 and 0.36, less than 0.6, or greater than 0.2. By proving fiber optic light guide structures 80 with numerical apertures in one of these ranges, display light entering each fiber optic light guide structure 80 may be received from only one associated display pixel 100.

Figure 8:
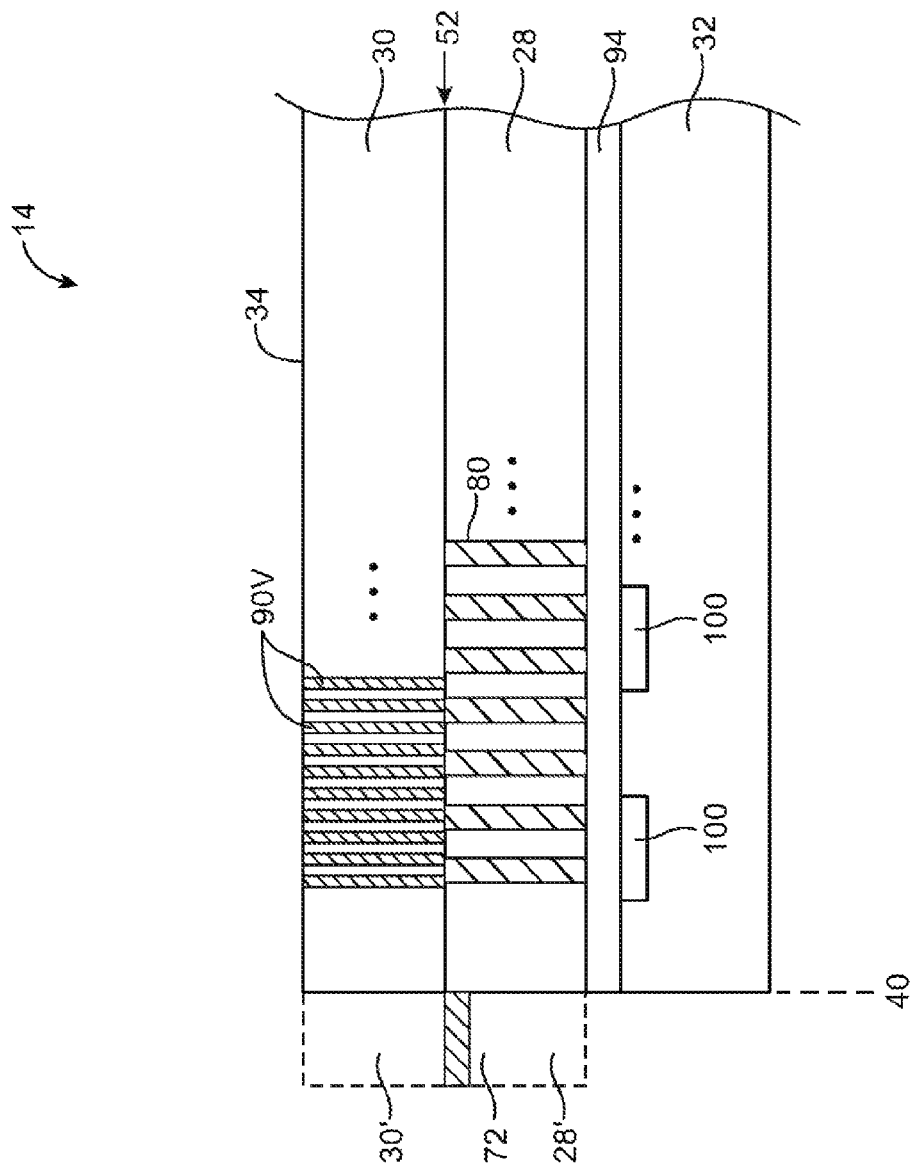
FIG. 8 is a cross-sectional end view of a portion of an illustrative display showing how an outer bundled optical fiber layer may include only vertical optical fibers in accordance with an embodiment of the present invention.

The configuration of FIG. 7 in which fiber bundle layer 30 is used to guide display light from a central portion of display 14 to an edge portion of display 14 is merely illustrative. As shown in FIG. 8, fiber bundle layer 30 may be provided with vertical fiber optic light guide structures 90V without including any angled fiber optic light guide structures.

If desired, in configurations in which fiber bundle layer 30 is provided with vertical fiber optic light guide structures 90V without including any angled fiber optic light guide structures, layer 30 may or may not include an extended edge portion 30' that extends beyond edge 40 of display layers 32. In configurations in which fiber bundle layer 30 is provided with only vertical fiber optic light guide structures 90V and layer 30 is provided with an extended portion 30', opaque masking material such as black mask 72 may be formed in an inner surface of layer 30. In this way, display 14 may be provided with a peripheral inactive region and a display with the ability to generate low-depth or zero-depth images that appear to be displayed on surface 34 of display 14 (e.g., on an outer surface of device 10 or on a surface that is nearer to the outer surface of device 10 than images displayed by conventional displays that do not have stacked fiber bundle layers.

Figure 9:
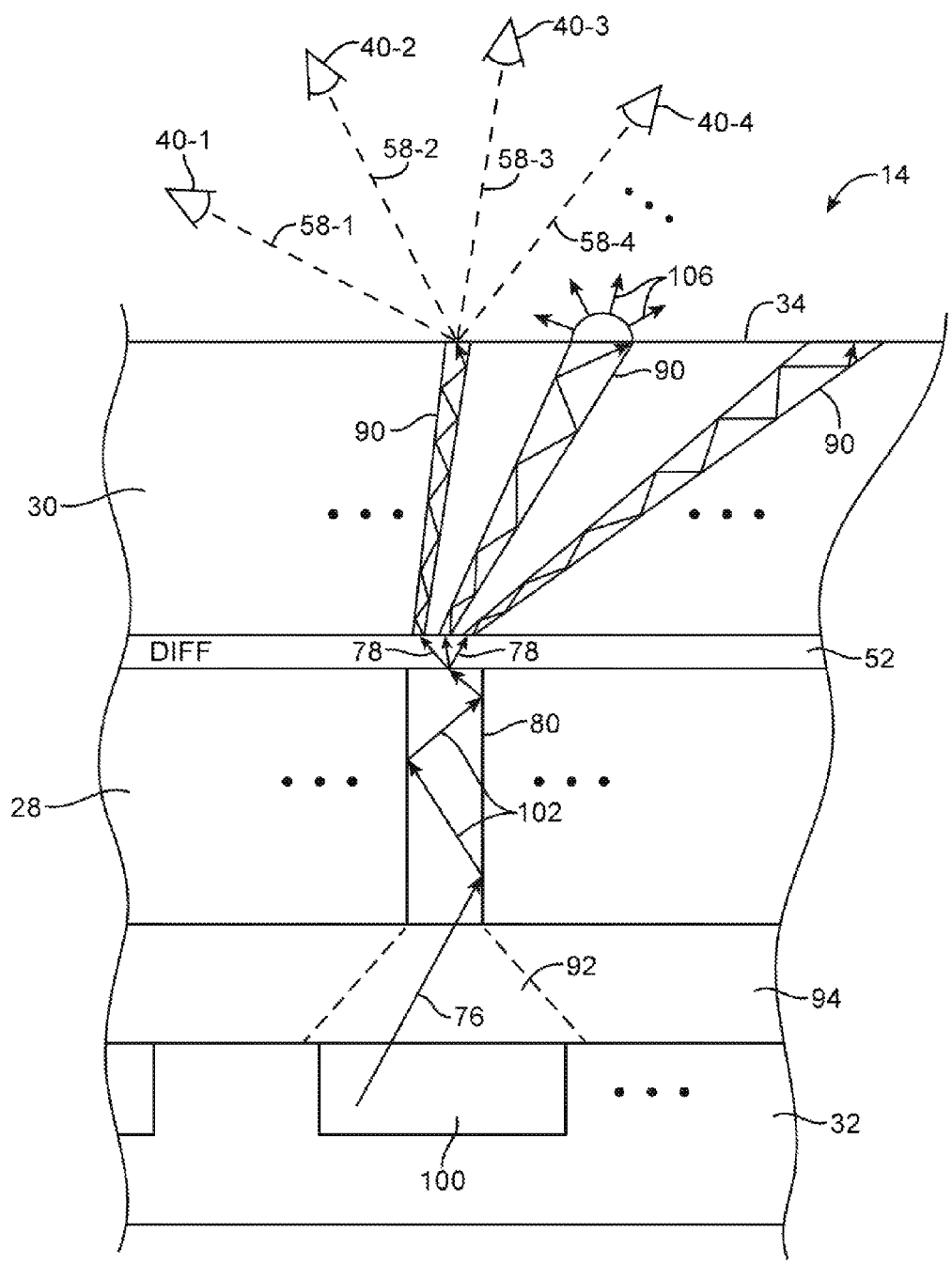
FIG. 9 is a cross-sectional side view of a portion of an illustrative display showing how display light generated in a display pixel may be guided to an outer surface of the display by optical fibers in first and second stacked optical fiber layers in accordance with an embodiment of the present invention.

FIG. 9 is a cross-sectional end view of a portion of display 14 showing how display light may be emitted from each fiber optic light guide structure 90 in a substantially hemispherical distribution of emission angles so that a user may view display 14 from a wide range of viewing angles. As shown in FIG. 9, display light that is emitted in a particular direction such as direction 76 from pixel 100 that is within acceptance cone 92 of a particular fiber optic light guide structure 80 may be accepted into that fiber optic light guide structure.

As indicated by arrows 102, the display light that has been accepted into fiber optic light guide structure 80 may be internally reflected from inner surfaces of fiber optic light guide structure 80 until being emitted into light diffusion layer 52. As indicated by arrows 78 and as described above in connection with FIGS. 4 and 5, the display light may be emitted from fiber optic light guide structure 80 in randomly distributed direction (e.g., as if being emitted from a Lambertian light source). The display light may then be transmitted into one or more associated fiber optic light guide structures 90.

Fiber optic light guide structures 90 may be configured to accept display light from a full hemisphere of acceptance angles (e.g., by providing fiber optic light guide structures 90 with a numerical aperture close to one).

As examples, fiber optic light guide structures 90 (e.g., structures 90V and/or 90A) may have numerical apertures that are greater than 0.9, greater than 0.95, greater than 0.98, or greater than 0.99. Display light may therefore be emitted from each fiber optic light guide structure 90 at surface 34 of display 14 in a full hemisphere of emission angles (as indicated by arrows 106).

In this way, viewers of display 14 such as users 41-1, 41-2, 41-3, and 41-4 viewing display 14 at viewing angles such as respective viewing angles 58-1, 58-2, 58-3, and 58-4 may be provided with a high quality image.

Figure 10:
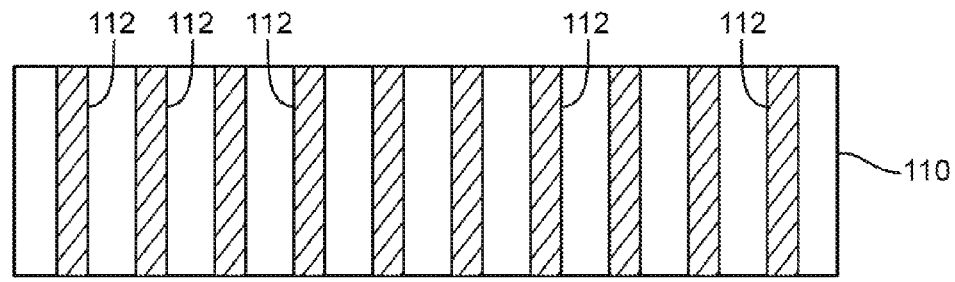
FIG. 10 is a cross-sectional end view of a substrate having multiple vertical optical fibers that may be used to form a bundled optical fiber layer for a display in accordance with an embodiment of the present invention.
Figure 11:
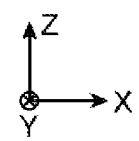
FIG. 11 is a cross-sectional end view of the substrate of FIG. 10 showing how the substrate may be slumped to form angled optical fibers that may be used to form a bundled optical fiber layer for a display in accordance with an embodiment of the present invention.
Figure 11:
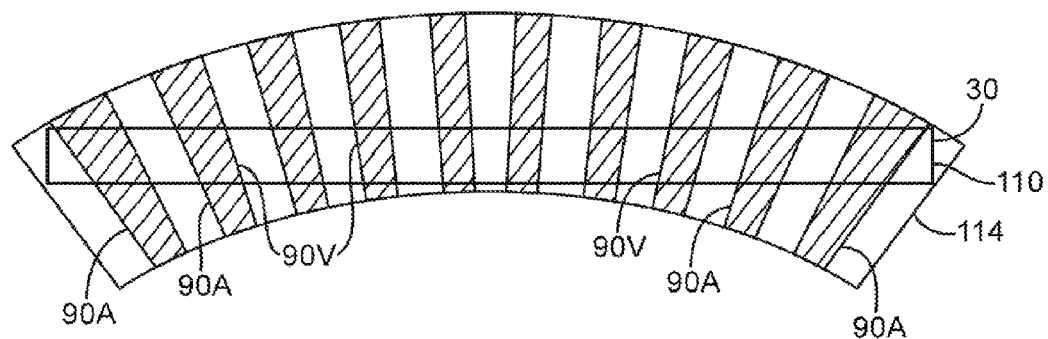
Figure 12:
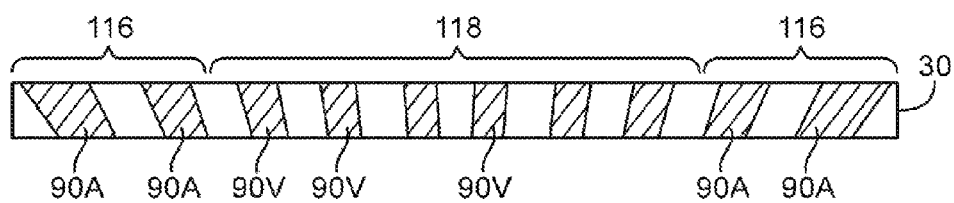
FIG. 12 is a cross-sectional end view of a portion of the slumped substrate of FIG. 11 showing how a bundled optical fiber layer with angled optical fibers for a display may be cut from a slumped substrate in accordance with an embodiment of the present invention.

During manufacturing of display 14, fiber bundle layer 30 may be provided with angled fiber optic light guide structures 90A in an edge portion of layer 30 and vertical fiber optic light guide structures 90V in a central portion of layer 30 as shown in FIGS. 10, 11, and 12.

As shown in FIG. 10, a substrate such as substrate 110 may be provided with substantially vertical fiber optic light guide structures 112 (e.g., parallel vertical optical fibers). Substrate 110 may, for example, be a glass substrate having bundled optical fibers 112.

As shown in FIG. 11, substrate 110 may be heated and allowed to slump (e.g., bend) into a curved configuration. An inner portion such as portion 114 of slumped substrate 110 may be used to form a fiber optic bundle layer such as layer 30 of display 14 having both vertical and angled fiber optic light guide structures 90V and 90A.

As shown in FIG. 12, portion 114 of substrate 110 may be cut away from the rest of substrate 110 to form fiber optic bundle layer 30 having vertical fiber optic light guide structures 90V in central portion 118 of substrate 30 and angled fiber optic light guide structures 90A in edge portions 116 of substrate 30. After cutting substrate 30 from substrate 110, substrate 30 may be attached to an additional fiber optic bundle layer such as layer 28 (see, e.g., FIG. 2) to form a portion of display 14 of device 10.

The foregoing is merely illustrative of the principles of this invention and various modifications can be made by those skilled in the art without departing from the scope and spirit of the invention.

What is claimed is:

1. A display, comprising:
   a plurality of display layers that generate display light for the display;
   a first substrate attached to the display layers that includes a plurality of first optical fibers; and
   a second substrate attached to the first substrate that includes a plurality of second optical fibers.

2. The display defined in claim 1 wherein the display layers comprise a plurality of display pixels that generate the display light, wherein at least one of the plurality of first optical fibers is configured to pass the display light generated by an associated one of the plurality of display pixels into at least one of the plurality of second optical fibers.

3. The display defined in claim 2 wherein each of the plurality of first optical fibers has a first common numerical aperture, wherein each of the plurality of second optical fibers has a second common numerical aperture, and wherein the first numerical aperture is smaller than the second numerical aperture.

4. The display defined in claim 2 wherein each of the plurality of first optical fibers has a common diameter, wherein each of the plurality of second optical fibers has a second common diameter and wherein the first diameter is larger than the second diameter.

5. The display defined in claim 1, further comprising:
   a light diffusing layer interposed between the first substrate and the second substrate.

6. The display defined in claim 5 wherein the light diffusing layer comprises surface features on a surface of the first substrate.

7. The display defined in claim 6 wherein the second substrate is fused to the surface of the first substrate.

8. The display defined in claim 5 wherein the light diffusing layer comprises an optically clear adhesive and light redirecting structures in the optically clear adhesive.

9. The display defined in claim 8 wherein the light redirecting structures comprise metallic particles.

10. The display defined in claim 1 wherein the plurality of display layers includes a light polarizing layer and wherein the first substrate is attached to the light polarizing layer.

11. The display defined in claim 1 wherein the first substrate comprises glass.

12. The display defined in claim 11 wherein the second substrate comprises glass.

13. A display, comprising:
    an array of light generating elements that generate display light;
    a first array of fiber optic light guide structures formed over the array of light generating elements; and
    a second array of fiber optic light guide structures formed over the first array of fiber optic light guide structures, wherein the display light generated by the array of light generating elements passes through the first array of fiber optic light guide structures and through the second array of fiber optic light guide structures.

14. The display defined in claim 13 wherein the first array of fiber optic light guide structures includes a plurality of fiber optic light guide structures that receive light from each of the light generating elements.

15. The display defined in claim 14 wherein the second array of fiber optic light guide structures includes a plurality of fiber optic light guide structures that receive light from each of the first fiber optic light guide structures.

16. The display defined in claim 15 wherein the plurality of fiber optic light guide structures that receive light from each of the light generating elements comprises at least nine fiber optic light guide structures that receive light from each of the light generating elements.

17. The display defined in claim 16 wherein the plurality of fiber optic light guide structures that receive light from each of the first fiber optic light guide structures comprises at least nine fiber optic light guide structures that receive light from each of the first fiber optic light guide structures.

18. The display defined in claim 13 wherein the second array of fiber optic light guide structures comprises:
    a substrate having first and second opposing surfaces; and
    a plurality of vertical fiber optic light guide structures that extend from the first surface to the second surface, wherein each of the vertical fiber optic light guide structures is elongated along an axis that is perpendicular to the first and second surfaces.

19. The display defined in claim 18 wherein the second array of fiber optic light guide structures further comprises:
    a plurality of angled fiber optic light guide structures that extend from the first surface to the second surface, wherein each of the angled fiber optic light guide structures is elongated along an axis that forms an angle other than ninety degrees with the first and second surfaces.

20. The display defined in claim 19 wherein the plurality of vertical fiber optic light guide structures are formed in a central portion of the display, wherein the angled fiber optic light guide structures extend from the central portion of the display to edge portions of the display, and wherein the angled fiber optic light guide structures guide at least some of the display light from the central portion of the display to the edge portions of the display.

21. An electronic device, comprising:
    a display having a thin-film transistor layer, a color filter layer, a layer of liquid crystal material interposed between the thin-film transistor layer and the color filter layer, and first and second bundled fiber optic layers, wherein the color filter layer has an edge, wherein the second bundled fiber optic layer has a portion that extends beyond the edge, and wherein the second bundled fiber optic layer is configured to guide display light into the portion that extends beyond the edge.

22. The electronic device defined in claim 21, further comprising:
    display control circuitry mounted along the edge of the color filter layer and behind the portion of the second bundled fiber optic layer that extends beyond the edge.

* * * * *